US006581327B2

(12) United States Patent
Adelberg et al.

(10) Patent No.: US 6,581,327 B2
(45) Date of Patent: Jun. 24, 2003

(54) APPARATUS AND METHOD FOR PROPAGATING PLANTS

(75) Inventors: Jeffrey W. Adelberg, Pendleton, SC (US); Maria P. Delgado, Seneca, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 10/191,998

(22) Filed: Jul. 9, 2002

(65) Prior Publication Data

US 2003/0032174 A1 Feb. 13, 2003

Related U.S. Application Data (62) Division of application No. 09/775,316, filed on Feb. 1, 2001, now Pat. No. 6,451,590.

(51) Int. Cl.⁷ .......................... A01B 79/00; A01H 3/00; C12N 5/00
(52) U.S. Cl. .................................. 47/58.1 R; 435/420
(58) Field of Search .................... 47/59 R, 64, 59 S, 47/58.1 R, 65.8; 435/289.1, 292.1, 297.1, 307.1, 260, 420

(56) References Cited

U.S. PATENT DOCUMENTS

| | | |
|---|---|---|
| 4,027,427 A | 6/1977 | Stoller et al. |
| 4,189,868 A | 2/1980 | Tymchuck et al. |
| 4,311,477 A | 1/1982 | Kitamura et al. |
| 4,460,365 A | 7/1984 | Ganshirt et al. |
| 4,878,312 A | 11/1989 | Shimizu |
| 5,525,505 A | 6/1996 | Young et al. |
| 5,597,731 A | 1/1997 | Young et al. |
| 5,862,628 A * | 1/1999 | Takashima .................. 47/65.8 |
| 5,943,821 A | 8/1999 | Ducos et al. |
| 6,054,319 A | 4/2000 | Worden et al. |
| 6,127,168 A | 10/2000 | Ko |

OTHER PUBLICATIONS

Disposable Cell Culture Technology Wave Bioreactor, http://www.wavebiotech.com.
Vijay Singh, Ph.D., Genetic Engineering News, vol. 19, No. 5, Mar. 1, 1999, Published by Mary Ann Liebert, Inc., New York.

* cited by examiner

Primary Examiner—David A. Redding
(74) Attorney, Agent, or Firm—Dority & Manning, P.A.

(57) ABSTRACT

A plant propagation apparatus is disclosed which comprises a flexible transparent enclosure. The enclosure is disposable, and could be formed of a polymer such as polyethylene. The enclosure would have at least two walls, formed of flexible material that facilitates transmission of light through the walls. Plant material is sealed within the enclosure, and nutrient solution is made available within the sealed enclosure for the plant. The enclosure is a low cost and effective method for propagating young plants and transporting them between the laboratory environment and a greenhouse or field. The enclosure may be configured to receive gas or carbon dioxide on its inner surface to a predetermined level of pressure, thereby affording the enclosure a flexible but stiff mechanical resistance that protects the young plant while it is growing.

28 Claims, 6 Drawing Sheets

APPARATUS AND METHOD FOR PROPAGATING PLANTS

CROSS REFERENCE TO RELATED APPLICATIONS

This application is a divisional application claiming priority to U.S. application Ser. No. 09/775,316 entitled "APPARATUS AND METHOD FOR PROPAGATING PLANTS", filed Feb. 1, 2001 now U.S. Pat. No. 6,451,590.

BACKGROUND OF THE INVENTION

The invention relates to plant propagation systems, and more particularly to aseptic propagation systems and methods.

Tissue culture propagation, sometimes referred to as micro propagation, is the process of growing plants from a piece of plant tissue that has been extracted from a parent plant. Horticulturists favor plant propagation as a growing method because its provides relatively high production efficiency and greater uniformity of plants. The process results in mass production of plants having certain desirable characteristics because substantially all the plants produced are genetically identical to and have all the desirable traits of the parent plant.

Plant micropropagation may be described as subdivided into stages. Stage one is sometimes said to comprise initiation, in which a plant bud is initiated in a growing media. Stage two comprises a multiplication phase in which nutrients and hormones are provided to enable rapid cell division and substantial growth of the platelets. In stage two, it is very important to keep pathogens and biological pests from infesting the culture. It is important to avoid subjecting the entire crop or field to biological pests, and one way to avoid subjecting the entire crop or field to biological pests is to propagate the plants in an environment that shields the maturing plant from pathogens, while also facilitating rapid and vigorous growth.

In stage three, leaves and shoots expand and the plant tissue becomes more capable of photosynthesizing. In stage four, the plant is moved out of the laboratory environment and into a greenhouse, where the plant may begin to take on larger amounts of light, and therefore heat, developing roots that will be needed for transfer to the field in the natural environment outdoors.

Environments conducive to root and shoot formation of the developing plant facilitates rampant spread of pests. Therefore, it is important to minimize the chances of introducing pests on plant material or media.

Apparatus and methods have been devised to micropropagate plants in the above referenced manner. For example, U.S. Pat. Nos. 5,525,505 and 5,597,731 are directed to plant propagation systems. These two referenced patents disclose sealed, semipermeable membrane vessels for completely enclosing plant material therein. The sealed vessels typically are translucent and permeable to gases and liquids while remaining impermeable to biological contaminates. Plant tissue extracted from a parent plant may be placed within the sealed vessels and grown heterotrophically. Once it develops, the plant may be transferred to a greenhouse environment for photoautotrophic growth. In the greenhouse environment, the sealed vessels are supported in trays, and exposed to light, gases, water, and a liquid nutrient solution for optimizing growth.

At least one patent has disclosed the use of a sealed sterile container with support members provided for plant tissues which are positioned between surfaces of the support members. U.S. Pat. No. 5,943,821 discloses support members within a sealed sterile container having opposing surfaces for supporting plant tissues made of a material that is suitable for impregnation by a nutritive medium. In the '821 patent, a cylindrical container that resembles a Petri dish is disclosed. In fact, a Petri dish is the suggested container to be used in the practice of the invention disclosed in the '821 patent, whereby such a hard cylindrical container may be sealed by means of plastic film, wax, or other material.

However, there are disadvantages with the use of such hard plastic containers. Such containers are relatively heavy, and therefore typically are very costly to ship from the laboratory to a greenhouse. Further, the containers must be re-used many times to make the use of such containers economically viable. Re-use requires that the containers be washed or sterilized, and then sent back to the laboratory. Storage also presents a problem, as the containers are not compressible (and sometimes not even stackable) which requires a large volume of space for storage. This storage problem adds to the undesirability of using such hard plastic tray containers as plant propagation containers.

What is needed in the plant propagation industry is a method and apparatus for producing plants in a manner that facilitates the entry of gases such as carbon dioxide into the vicinity of the plant. An apparatus that provides for light transmission and a steady nutrient supply is desired. Furthermore, a lightweight and inexpensive method of propagating large numbers of plants easily, reproducibly, reliably, and at a minimum cost to a grower is needed. Adequate nutrients and gases must be provided to the plant while at the same time shielding plant seedlings from undesirable biological pathogens. Furthermore, the apparatus must be capable of maintaining the plant at an appropriate temperature while the plant is propagating.

SUMMARY OF THE INVENTION

The present invention recognizes and addresses the foregoing disadvantages, and others of prior art constructions, and methods.

Accordingly, it is an object of the present invention to provide a plant propagation system.

It is another object of the present invention to provide a new method for propagating plant material.

It is a further object of the present invention to provide a plant propagation system and method that does not rely upon hard rigid containers.

It is another object of the present invention to provide a plant propagation system and method that prevents contamination of the growing plant material.

It is another object of the present invention to provide a plant propagation system and method that continually replenishes the nutrients and gasses necessary for plant growth.

It is further object of the present invention to provide a plant propagation system and method that facilitates the transportation of plant material.

It is a further object of the present invention to employ an apparatus for cooling plant containers during growth.

It is another object of the invention to replenish or change the composition of nutrients and gases necessary for plant growth. It is an objective to provide a system that is well suited to grow plants in several physiological stages and production environments.

The invention comprises plant propagation apparatus having a disposable sealed transparent enclosure having at least two walls. The walls, in one embodiment, are formed of a flexible material that facilitates transmission of light through the walls, the enclosure having an inner space and an outer surface. The enclosure is capable of sealing plant material in a substantially airtight manner. The enclosure is capable of maintaining on its inner space a reservoir of liquid nutrient solution for uptake by said plant material. The enclosure is configured to receive gas on its inner space to a predetermined level or pressure, thereby affording to the enclosure a flexible mechanical resistance. The enclosure is capable of protecting the plant material from mechanical stress during handling and transport while affording a flexible packing mechanism for the plant material.

In one embodiment, the apparatus also includes a gas diffusion membrane vent to facilitate diffusion of gases from the outer surface of the enclosure to the inner space of the enclosure. For example, air, oxygen, or carbon dioxide can enter the enclosure through such a membrane vent.

In other embodiments, the apparatus is adapted to assume a configuration that at least partially blocks the flow of gas across the gas diffusion membrane vent. This may be accomplished by folding over a membrane vent of the enclosure, or by blocking the membrane vent using a patch or cover. Furthermore, the membrane vent may be adapted to retard the communication of pathogens from the outer surface of the enclosure to the inner space of the enclosure.

In general, the enclosures are adapted to be placed side by side in a shipping carton for transport, the enclosure having a gas pressure on its inner space that facilitates close packing without substantial damage to the plant material. Large numbers of plants can be shipped easily in this way.

The invention also includes a system for propagating plants that comprises a disposable sealed transparent enclosure having at least two walls, the walls being formed of a flexible material that facilitates transmission of light through the walls. In this system, the enclosure has an inner space and an outer surface, the enclosure being capable of sealing plant material in a substantially airtight manner, whereby the enclosure is capable of maintaining on its inner space a reservoir of liquid nutrient solution for uptake by the plant material. The enclosure is also configured to receive gas on its inner space to generate pressure to a predetermined level. In this way, it is possible to afford to the enclosure a flexible mechanical resistance.

A support tray is also provided, the tray being adapted to thermally buffer the enclosure by supporting a cooling fluid, such as water, upon at least a portion of the outer surface of the enclosure.

The invention may also comprise a method of propagating plant material. In the method, several steps may be performed, at least some of which include: providing a flexible film, living plant material, and a nutrient solution, then sealing the flexible film to form an airtight three-dimensional enclosure having an inner space. In the method, the enclosure has on its inner space living plant material and a nutrient solution. Also, gas is provided to the inner space of the enclosure in an amount that affords mechanical stability to the enclosure. The enclosure is adapted to assume a volume and shape that is supportive of vertical growth of the living plant material. The enclosure is adapted to facilitate shipping and transport of the enclosure in packed boxes or crates.

In some methods, gas is injected through a hole in the wall of the enclosure, then the hole is resealed to provide an airtight enclosure. The method, in some embodiments, may also comprise removing the acclimatized plant material from the enclosure and then planting the living plant material in soil.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

In the high volume production of plants for consumer and agricultural uses, it is critical to develop a system for containing and propagating plant material that is easy, inexpensive and effective in propagating the plants. Stage one of plant propagation is generally the initiation stage in which a shoot or a bulb is initiated in the enclosure of the invention. In stage two of development, plants uptake nutrients and growth regulators to encourage rapidly dividing cells within the plant. In the first two stages of plant growth, therefore, there are high metabolic requirements for energy consumption. In general, during the first two stages of growth, the plant tissue is not capable of carrying out adequate photosynthesis to meet this high demand for energy.

The initial growth of tissue in the enclosures of the invention is accomplished heterotrophically. Heterotrophic or photomixotrophic growth is growth in which the organism obtains nourishment and energy from the ingestion and break down of organic matter. During this phase, the plant tissue is typically exposed to adequate light intensity to sustain growth. The organic carbon is usually obtained from sugars such as sucrose.

In general, micropropagation is commonly completed in a mist or fog enclosure in a greenhouse. These environments provide haven for biotic pests. Therefore it is common for the clean products of a lab to be shipped and sold in septic media from a mist or fog house. Furthermore, water is constantly percolated through the soilless media, so the small plants with rudimentary roots do not dessicate. The percolation of water leaches the soluble fertilizer salts down through the media profile, making fertilizer scarce for the rudimentary root system. Therefore, plants from a mist or fog house are also nutrient starved when delivered to the end user.

In the third stage of plant growth, leaves and shoots expand and the plant tissue develops the capability of photosynthesizing. That is, the plant tissue, when exposed to light, gases, water and essential nutrients, derives energy through the process of photosynthesis. Photoautotrophic growth occurs when the plant organism synthesizes organic nutrients by deriving energy from light. That is, once photoautotrophic growth begins, the plant tissue becomes capable of making its own food in sufficient quantity to support photoautotrophic growth.

Generally, plants need oxygen, carbon dioxide, water, nutrients, and light for carrying out respiration and growth processes. Oxygen, carbon dioxide and light can be provided to the plant material from the atmosphere. During photosynthesis, besides carbon dioxide and light energy, the plant material needs water, in order to synthesize carbohydrates. However, the liquid growth media can include water as an ingredient in concentrations sufficient to support photoautotrophic growth.

As described, plants require carbon dioxide in order to carry out photosynthesis for producing carbohydrates. In the past, when sealed in containers, plants have been slow to photosynthesize. A possible cause for this deficiency may result from the depletion of carbon dioxide within the container. In order to overcome this problem, the plant propagation system can optionally include enrichment from an external carbon dioxide source.

Figures 1, 1A:
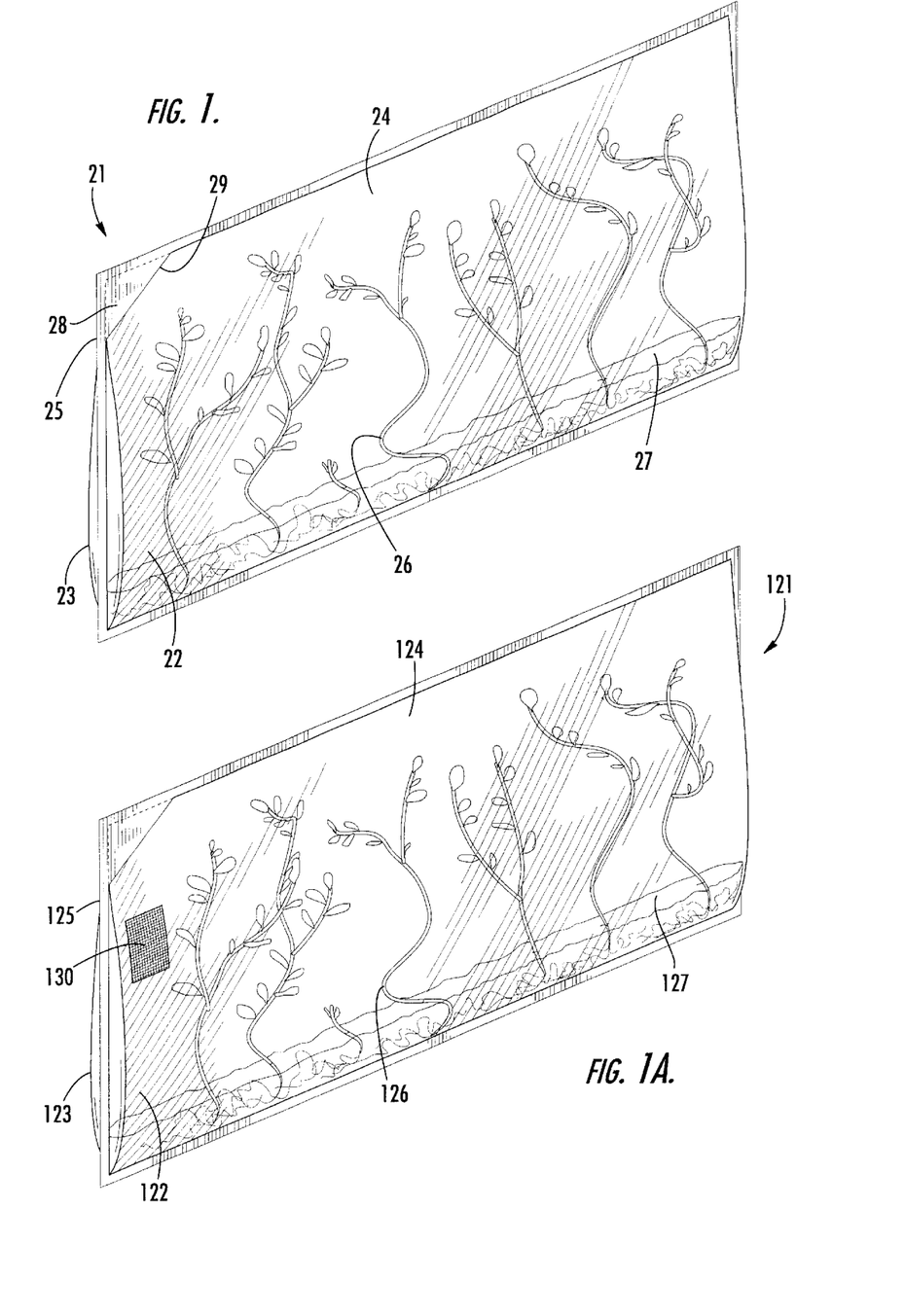
FIG. 1 provides a perspective view of the sealed transparent enclosure of the invention.
FIG. 1A shows an alternate embodiment of the enclosure having a membrane vent on a wall of the enclosure for admitting gases into the enclosure.

Turning to FIG. 1, a sealed enclosure 21 is shown having a generally transparent exterior. A first wall 22 is opposite a second wall 23, and an inner space 24 is between the first wall 22 and the second wall 23. Furthermore, an outer surface 25 is provided on the outside of the enclosure 21. Plant material 26, in the form of one or more propagules, is provided inside the sealed enclosure 21. A reservoir 27 of liquid nutrient solution is also provided in the sealed enclosure 21.

Injection area 28 comprises generally one corner of the enclosure, into which a syringe may be introduced to provide sterile gasses through a filter capsule to the interior of the sealed enclosure 21 after the enclosure is sealed with plant material placed inside. Once gasses are provided to the sealed enclosure in the appropriate volume and pressure, the sealed enclosure 21 may be sealed at sealing line 29 in order to isolate the hole made in the sealed area 28 from the rest of the sealed enclosure 21, so that the sealed enclosure 21 may be "resealed" after injecting gas into the inner space 24 of the enclosure 21.

In FIG. 1A, a sealed enclosure 121 is provided which shows an alternate embodiment of the invention. In this embodiment, a first wall 122 and a second wall 123 is provided, with an inner space 124 separating said walls. An outer surface 125 is also provided. Plant material 126 is positioned between the first wall 122 and the second wall 123. Furthermore, a reservoir 127 is provided near the lower portion of the enclosure 121. In this embodiment, a gas diffusion membrane vent 130 is provided upon the first wall 122 of the enclosure. The gas diffusion membrane vent 130 provides an area in which gasses may be transferred into the inner space 124 of the enclosure 121. However, the membrane vent 130 also serves as a screen against biological contaminants or pests that might otherwise enter the enclosure 121 through the membrane vent 130. Furthermore, the enclosure of FIG. 1A may be folded over the membrane vent 130 so that water loss is minimized at a time that carbon dioxide in the headspace is not so important. The heterotrophic or photomixotrophic phase of growth is an example.

Figure 2:
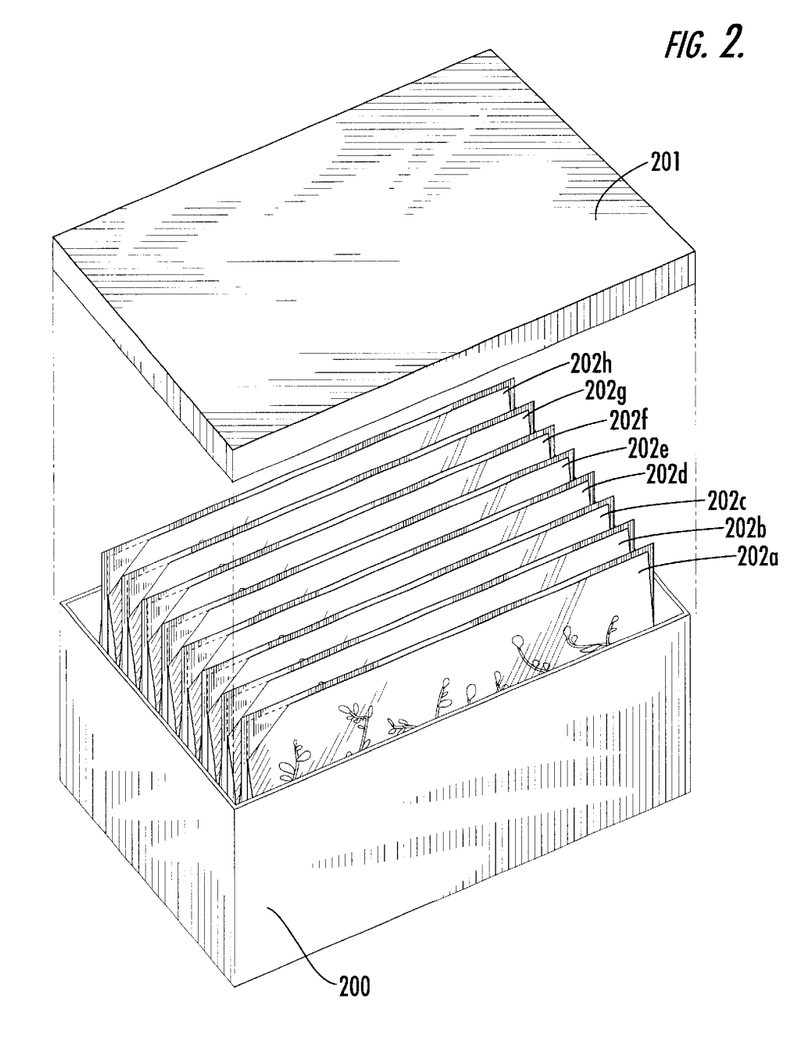
FIG. 2 shows how the enclosures of FIG. 1 or FIG. 1A may be packed for shipment from a laboratory environment to a greenhouse, or in some cases to a field for planting.

FIG. 2 shows a method of transporting the enclosures of the invention. In FIG. 2, a plurality of enclosures 202a–h are shown arranged in a parallel fashion within a transport box 200. Thus, when the enclosures are filled with plant material, and provided with the appropriate amount of gas and nutrient solution, they may be transported from a laboratory environment to another laboratory or greenhouse environment, for example. In other examples, the enclosures 202a–h could be used to transport plant seedlings or other plant material from a greenhouse environment to the field. In some instances, it might be possible to transport plant material directly from the laboratory to the field. In any event, transportation of plant seedlings may be easily and quickly accomplished using the enclosures of the invention. A box lid 201 optionally may be provided to support the upper surface over the enclosures 202a–h during transport.

Figure 3:
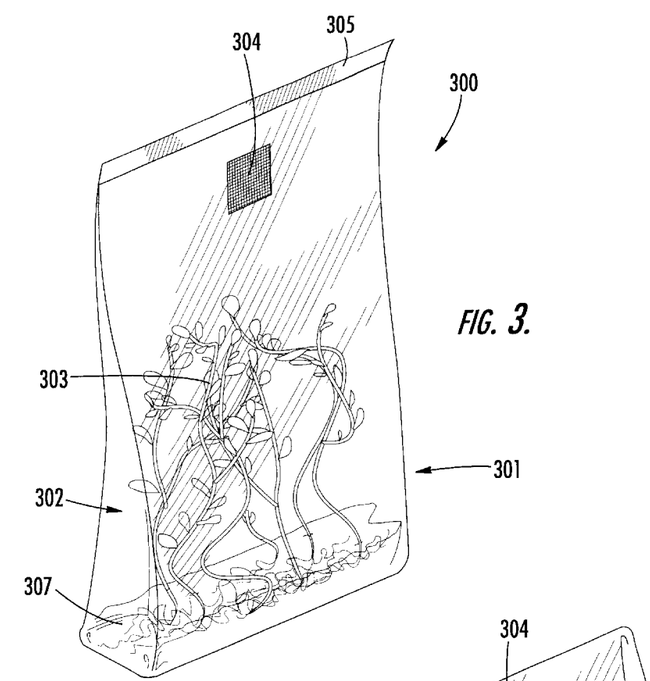
FIG. 3 shows an alternate embodiment of the invention in which the enclosure has at least about five walls and gussets on two walls.

FIG. 3 shows an alternate embodiment of the invention in which an enclosure 300 is comprised of at least four walls and a bottom portion. A gusset 301 and gusset 302 are provided on each side of the enclosure 300, and plant material 303 is shown within the enclosure 300. An optional membrane vent 304 is shown near the top of the enclosure 300, and the top margin of the enclosure may be heat sealed along sealed margin 305.

Figure 3A:
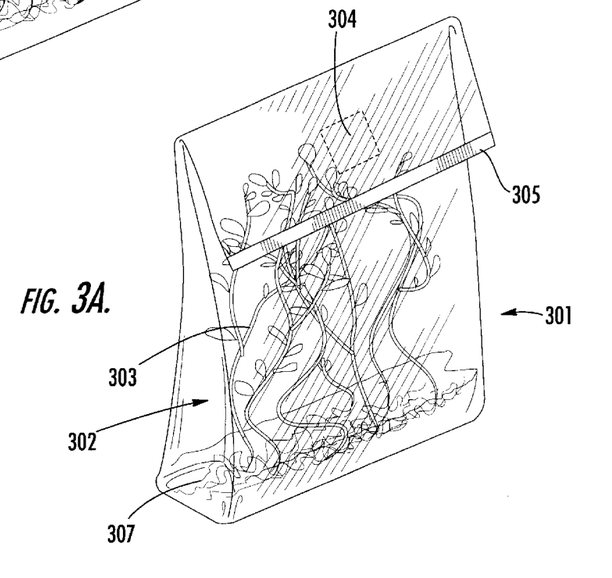
FIG. 3A shows the embodiment of the invention shown in FIG. 3 in which contains the membrane vent and is partially blocked to reduce the movement of gases into the enclosure.

FIG. 3A shows the embodiment of FIG. 3 in which the top membrane vention of the enclosure 300 has been folded over to partially block the flow of gasses into or out of the membrane vent 304. Thus, for example it might be possible to fill the enclosure 300 with an appropriate amount of nutrient solution 307, and the correct gasses for healthy plant growth. Then, the plants could receive gasses (i.e.: respire) in the laboratory environment while they are growing, and just prior to transport the top portion of the enclosure 300 could be folded over to avoid gas exchange into the enclosure 300 during transport. Furthermore, folding over the enclosure 300 during transport would perhaps pack the enclosure 300 in a more compact arrangement for shipping and transport.

Figure 4:
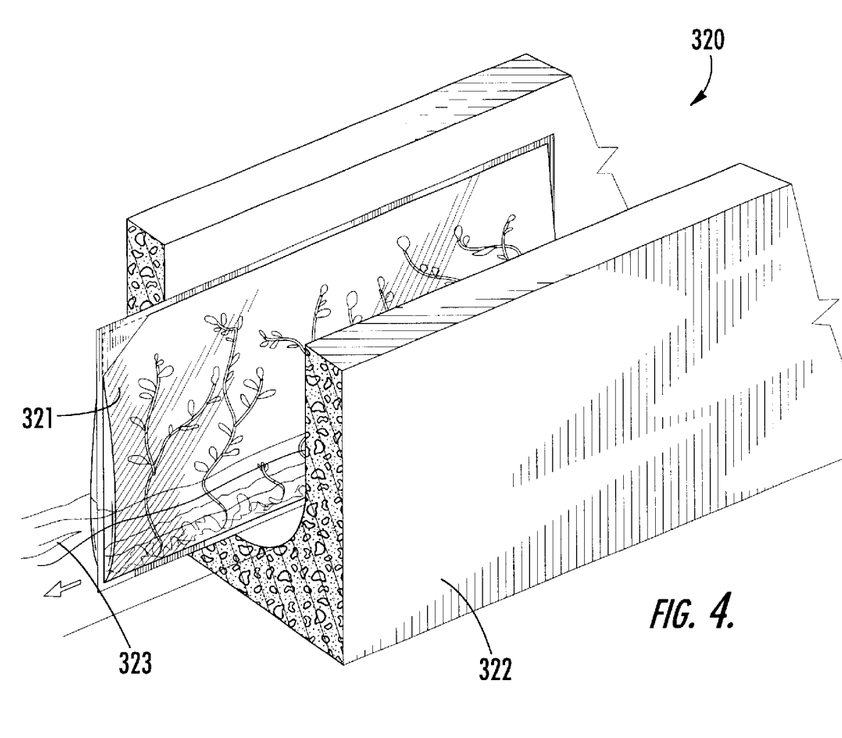
FIG. 4 shows a partial cross-section of one embodiment of the invention in which the enclosure is provided in a support tray that is adapted to thermally buffer the enclosure.

FIG. 4 shows a partial cross-section of a tray assembly 320 of the invention. In a greenhouse or outdoor environment, it would be possible to place enclosures 321 and/or 300 within a support tray 322 to receive direct sunlight once the plants are capable of photosynthesizing for themselves. In order to reduce the excess heat generated by intense sunlight upon the enclosure 321, a cooling fluid 323 could be provided within the support tray 322, and allowed to flow past enclosure 321 while it rests in the support tray. Thus, light could easily impinge upon the enclosure 321, and it would be naturally cooled by the cooling fluid 323 passing within the support tray 322. In a commercial environment, a large number of enclosures 321 could be placed in series along support trays which are substantial in their length. Support tray 322 could be comprised of an insulated material such as styrofoam or fiberglass.

Figure 4A:
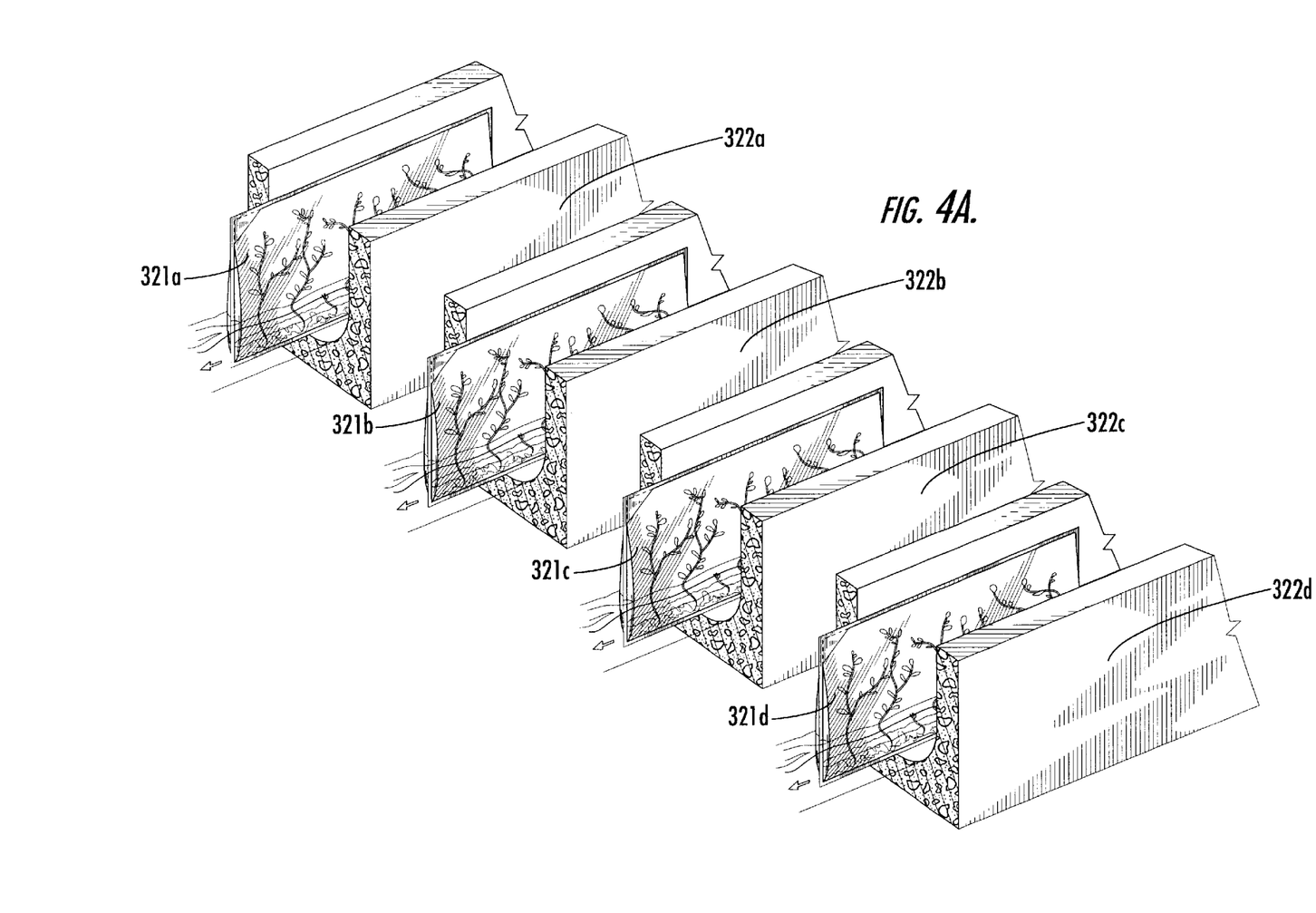
FIG. 4A shows a partial cross-section of several support trays in parallel, as may be employed in a large volume growing environment.

In FIG. 4A, an embodiment showing a commercial use of the invention is shown in which numerous support trays 322a–d are shown arranged in parallel. These support trays could each support tens or hundreds of enclosures 321a–d and/or 300 along their inner surfaces. In some embodiments, it might be possible to provide support trays 322a–d in a matrix having both a vertical and horizontal component. In other embodiments, the support trays could be placed in a rotating turret assembly which rotates according to the amount of light that impinges upon the trays during the path of the sun across the sky. Such mechanisms could be timed to receive an appropriate amount of light upon each support tray, and an apparatus could easily be devised by a person of skill in the art that would provide an appropriate current of cooling fluid along each support tray.

Figure 5:
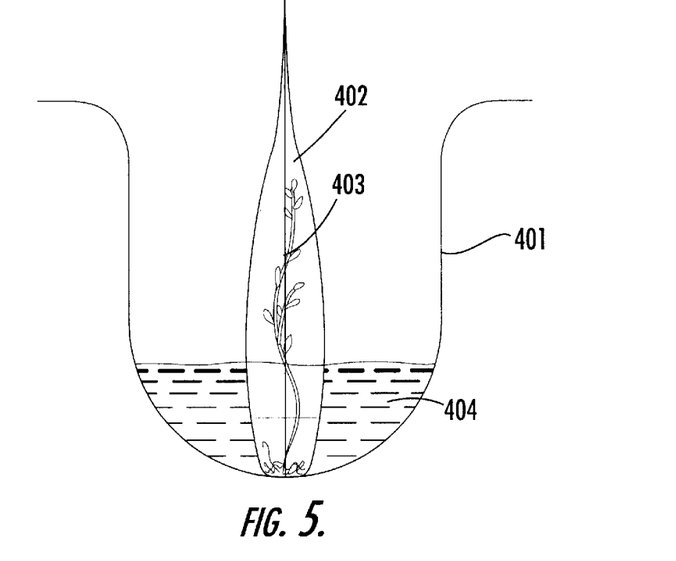
FIG. 5 is an end view of the system shown in FIG. 4 showing a cooling fluid passing along the lower surface of the enclosure.

FIG. 5 shows an end view of a support tray 401 which has within it an enclosure 402 that contains plant material 403. A cooling fluid 404 is shown in the bottom of the support tray 401. The end view shown in FIG. 5 is an end view of the support trays shown in FIGS. 4 and 4A.

Figure 6:
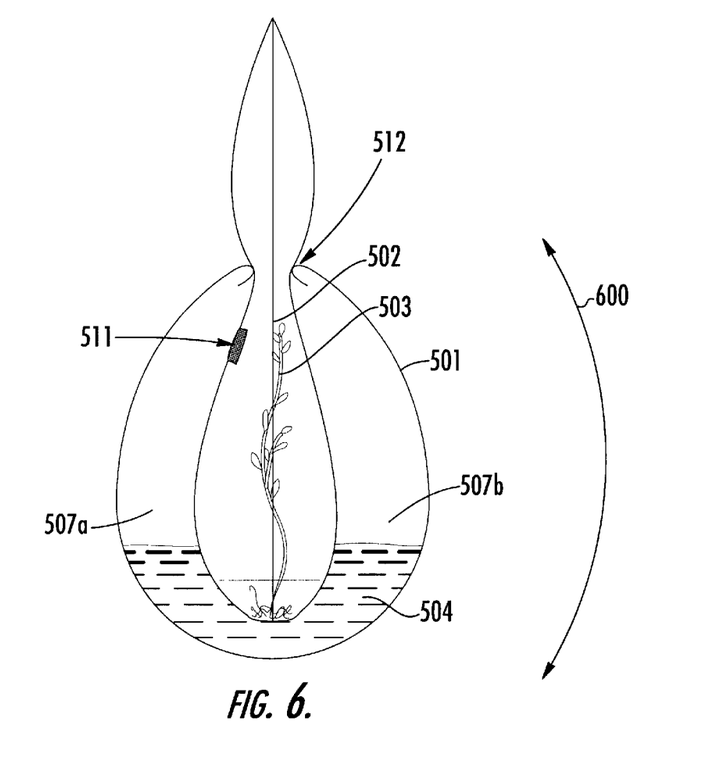
FIG. 6 shows an alternate embodiment of the system shown in FIG. 5 in which the support tray of the system is tightly fitted to the sealed enclosure and is adapted for administering carbon dioxide into the enclosed space, thereby providing a carbon dioxide enriched gaseous environment within the enclosed space of the support tray.

In FIG. 6, on the other hand, an alternate embodiment is shown. In that Figure, a support tray 501 which extends in a tubular fashion nearly all the way to the top membrane vention of enclosure 502 on each side is seen. By almost completely encircling the enclosure 502, an enclosed space 507a and 507b is formed on each respective side of the enclosure 502. Likewise, cooling fluid 504 is shown near the bottom of FIG. 6. Plant material 503 is shown within the enclosure 502. Membrane vent 511 allows carbon dioxide to enter the enclosed spaces 507a–b. A partial seal 512 is provided as the buoyant enclosure 502 is raised to contact the tray 501 at partial seal 512. Importantly, the embodiment shown in FIG. 6 would be capable of receiving carbon dioxide or other gaseous injection into the enclosed space 507a or 507b to provide, for example, a carbon dioxide enriched environment surrounding the enclosure 502. Several different embodiments could be devised by a person of skill in the art, and it would be possible to provide the enclosure 502 at a higher level so that the plant material received direct sunlight, or in other cases indirect sunlight coming through the top of the tray 501 would be sufficient.

Furthermore, plexiglass panels could be provided along the walls of the tray 501 to allow sunlight to come in, but still maintain an enclosed space 507a and 507b for facilitating an enriched gaseous environment. When using enclosures having a membrane vent on the surface of the enclosure, enriched carbon dioxide gas would be allowed to diffuse through the membrane vent, perhaps accelerating plant growth.

In other embodiments, it would be possible to provide a gear sprocket or other mechanical device, which could be attached to the end of the thermally buffered enclosure. Such a device could be constructed by a person of skill in the art, and would be capable of facilitating shoot canopies to be manipulated so that leaves of the plant are coincident or oblique with respect to direct sunlight. This sort of device would be useful to manage light and heat, cloud cover, seasons, and diurinal variation. It could rotate the apparatus along rotation tilt axis 600 to face the plant material toward or away from the angle of solar incidence. The rotation could be up to about 45° in one direction, and up to about 45° in the other direction (i.e.: deviation from vertical).

A further optional feature that can be added to the plant propagation system is a spectral filter for filtering the light before it reaches the plant material. Filtering can be accomplished using colored or shaded flexible film. Films that admit only light of preferred wavelength also may be employed. Light reflective film may also be used. For instance, when plants first arrive from a laboratory, solar radiation may be too intense for chloroplasts developed under low light conditions. Also, some plants tend to grow better when only exposed to light in a particular range of wavelengths. Particularly, red light has been demonstrated to increase growth rates in some plant species.

As constructed, the sealed enclosure is generally impermeable to biological contaminants. As such, plant material, enclosed within the sealed enclosures, can receive light, oxygen, carbon dioxide, water, nutrients and other growth and respiratory needs while remaining shielded against pathogenic microorganisms. The plant material such as vegetative buds, bulbets, miocrotubers, or somatic embryos can be placed within the sealed vessels when capable of forming shoots, but ill-suited for autotrophic growth. At this stage, the sealed vessel can be exposed to a liquid solution containing organic carbon for the heterotrophic or photo-mixotrophic growth and development of the plant. Once developed into a small plant capable of surviving in soil, the plant material can be transplanted as desired. Consequently, the plant material can be developed into a photosynthetic plantlet without ever being removed from the sealed enclosures.

Further, the sealed vessels can be used to facilitate transportation of the plant material to any desired location. For instance, some material is prohibited from international commerce due to possible accidental inclusions of biological contaminants on plant tissue or media. As plants in this invention are produced free from biotic contaminants, and on sterile substrata, quarantine regulations would be satisfied.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A method of propagating plants, comprising:
   (a) providing a light permeable film;
   (b) sealing said light permeable film to form a substantially gas impermeable three-dimensional enclosure, said enclosure having at least two walls, said enclosure having an inner space positioned between said walls, said enclosure further having an outer surface, said enclosure further having a substantially watertight lower portion;
   (c) providing living plant material having a root system and leaves within said inner space of said enclosure;
   (d) providing a reservoir of liquid nutrient solution within said substantially watertight lower portion of said inner space of said enclosure;

(e) positioning said root system of said living plant material for contact with said reservoir of liquid nutrient solution, thereby facilitating nutrient uptake by said root system; and (f) providing gas to said inner space of said enclosure, said enclosure being adapted for assuming a volume and shape that facilitates vertical growth of said living plant material within said enclosure.

2. The method of claim 1 further comprising the steps of:

(g) providing a hole in a wall of said enclosure;

(h) injecting gas through said hole in said wall of said enclosure; and (i) sealing said hole to provide a gas filled airtight enclosure.

3. The method of claim 2 further comprising the steps of:

(j) removing said living plant material from said enclosure; and (k) planting said living plant material in soil;

(l) subdividing said living plant material.

4. The method of claim 3 further comprising the step of:

(m) recycling for reuse said film of said enclosure.

5. The method of claim 1 further comprising the step of:

(g) contacting said outer surface of said enclosure with a fluid, (h) removing heat from the inner space of the enclosure by contact with said fluid.

6. A method of propagating plants, comprising:

(a) providing a transparent film;

(b) sealing said transparent film to form a three-dimensional enclosure capable of maintaining an inner positive gas pressure, said enclosure having at least two walls, said enclosure having an inner space positioned between said walls, said enclosure further having an outer surface, said enclosure further having a substantially watertight lower portion, said enclosure further having a membrane vent upon said outer surface;

(c) providing living plant material having a root system and leaves within the inner space of said enclosure;

(d) providing a reservoir of liquid nutrient solution within said substantially watertight lower portion of said inner space of said enclosure;

(e) positioning said root system of said living plant material for contact with said reservoir of liquid nutrient solution, thereby facilitating nutrient uptake by said root system; and (f) diffusing gas through said membrane vent.

7. The method of claim 6 wherein said membrane vent is capable of assuming both an open and a closed configuration, further comprising the step of:

(g) opening said membrane vent to facilitate gas diffusion through said vent while growing said living plant material; and (h) closing said membrane vent to avoid gas diffusion during transport of said enclosure.

8. The method of claim 6 further comprising the steps of:

(g) positioning said enclosure within a support tray.

9. The method of claim 8 further comprising the steps of:

(h) admitting sunlight through said transparent film to the inner space of said enclosure.

10. The method of claim 9 further comprising the steps of:

(i) applying a cooling fluid to said outer surface of said enclosure, thereby lowering the temperature of said inner space of said enclosure.

11. The method of claim 10 further comprising the steps of:

(j) providing a plurality of said enclosures at spaced intervals within said support tray.

12. The method of claim 11, further comprising the steps of:

(k) moving said support tray from a first position whereby sunlight impinges upon said enclosure to a second position in which sunlight does not impinge upon said enclosure.

13. The method of claim 12 wherein said moving step is provided in a timed cycle to coincide with daily sunlight variations.

14. The method of claim 13 additionally comprising the following step:

(l) providing a plurality of support trays having enclosures deposited therein, said support trays being provided in a generally parallel position upon a turret assembly, wherein said movement in step (k) comprises rotational movement of said turret assembly, thereby applying sunlight to said enclosures in a timed sequence.

15. A method of growing plants, comprising:

(a) providing a film enclosure, said film enclosure having at least two walls, said enclosure having an inner space positioned between said walls, said enclosure further having an outer surface, said enclosure providing a substantially water impermeable lower portion and a membrane vent positioned upon said outer surface, said enclosure being capable of maintaining a gas positive pressure within its inner space;

(b) providing living plant material having a root system and leaves within said inner space of said enclosure;

(c) providing a reservoir of liquid nutrient solution within said substantially watertight lower portion of said inner space of said enclosure;

(d) positioning said root system of said living plant material for contact with said reservoir of liquid nutrient solution, thereby facilitating nutrient uptake by said root system; and (e) providing a support tray having a lower surface adapted for transporting a fluid; said enclosure being positioned within said support tray; and (f) delivering a cooling fluid along said lower surface of said support tray, said cooling fluid contacting said outer surface of said enclosure, thereby removing heat from said inner space of said enclosure.

16. The method of claim 15 wherein:

said support tray substantially surrounds said enclosure, said support tray further providing an enclosed space above said cooling fluid, said enclosed space being adapted for providing a gas; and said enclosure having a membrane vent located upon said outer surface of said enclosure; and wherein said membrane vent is configured to admit gas from said enclosed space to said inner space of said enclosure.

17. The method of claim 16 wherein carbon dioxide gas is provided to said enclosed space.

18. The method of claim 17 whereby said support tray comprises a generally elongated tubular structure having a longitudinally directed opening provided along the length of said tubular structure, wherein enclosures are provided within said tubular structure, further wherein said enclosures comprise an upper portion containing the main body of said living plant material, said upper portion of said enclosures being configured to extend above said opening in said support tray, whereby the upper portions of said enclosures are positioned for receiving sunlight, while the outer surface of said lower portion of said enclosure is positioned to receive a cooling fluid, said cooling fluid being provided within said support tray.

19. The method of claim 15 wherein said support tray comprises at least two walls, one of said walls providing a light transmitting panel that facilitates entry of light into said support tray.

20. The method of claim 19 wherein said panel comprises a light permeable polymeric material.

21. The method of claim 18 wherein said support tray further comprises a rotational axis perpendicular to said elongated tubular support tray, wherein said support tray is configured for reciprocating rotational motion along said rotational axis, said motion facilitating the control of light impingement upon the upper portion of said enclosures.

22. A method of propagating plant material in an aseptic environment, comprising:
   (a) providing living plant material having a root system into a sealed light permeable film enclosure, said enclosure further having an outer surface and an inner space, said enclosure being configured to accommodate within said inner space living plant material and a nutrient solution, said inner space further comprising a lower portion and an upper portion and said enclosure capable of maintaining a positive gas pressure within the inner space;
   (b) providing a reservoir of liquid nutrient solution within said lower portion of said inner space of said enclosure;
   (c) providing a gas within said upper portion of said inner space of said enclosure, said gas including oxygen and carbon dioxide;
   (d) positioning said root system of said living plant material for direct contact with said reservoir of liquid nutrient solution, thereby facilitating nutrient uptake by said root system; and
   (e) placing said enclosure in an environment containing light, wherein said light is capable of penetrating said enclosure to facilitate growth of said living plant material within said enclosure.

23. The method of claim 22 further comprising the following step:
   (f) providing a vent upon said outer surface of said enclosure, wherein gas may move into and out of said enclosure through said vent.

24. The method of claim 22 wherein said enclosure facilitates growth of said living plant material while resisting influx of biological contaminants.

25. The method of claim 22, wherein the providing step (c) further includes the steps of:
   (f) providing a hole in said outer surface of said enclosure;
   (g) injecting gas through said hole; and
   (h) sealing said hole.

26. The method of claim 25 further comprising the step of:
   (i) removing said living plant material from said enclosure; and
   (j) planting said living plant material in soil.

27. The method of claim 26 further comprising the step of:
   (k) recycling said film of said enclosure.

28. The method of claim 22 further comprising the steps of:
   (f) contacting said outer surface of said enclosure with a cooling fluid, and
   (g) removing heat from said inner space of said enclosure using said cooling fluid.

* * * * *